United States Patent [19]

Schlessel

[11] 4,135,672

[45] Jan. 23, 1979

[54] GRINDING MILL FOR COFFEE BEANS AND THE LIKE

[75] Inventor: Walter Schlessel, Lawrence, N.Y.

[73] Assignee: Gemco-Ware, Inc., Freeport, N.Y.

[21] Appl. No.: 777,072

[22] Filed: Mar. 14, 1977

[51] Int. Cl.² .................... A47J 42/04; A47J 42/10
[52] U.S. Cl. ........................ 241/169.1; 241/257 R; 241/261.1
[58] Field of Search .............. 241/168, 169, 169.1, 241/248, 252 R, 258, 261.1

[56] References Cited

U.S. PATENT DOCUMENTS

| | | | |
|---|---|---|---|
| 2,688,448 | 9/1954 | Lenz | 241/168 |
| 2,763,440 | 9/1956 | Johnson | 241/248 X |
| 3,130,927 | 4/1964 | Schmieding | 241/261.1 X |
| 3,136,491 | 6/1964 | Posmanter | 241/257 R X |
| 3,991,947 | 11/1976 | Schlessel | 241/169.1 |
| 4,026,490 | 5/1977 | Johansson | 241/169.1 |

FOREIGN PATENT DOCUMENTS 1274639 9/1961 France ........................ 241/168

*Primary Examiner*—Howard N. Goldberg
*Attorney, Agent, or Firm*—Lackenbach, Lilling & Siegel

[57] ABSTRACT

A grinding mill for coffee beans and the like including a receiver for articles to be ground having in its lower region at least one passageway for gravitationally passing the articles, a relatively rotative discharge member beneath the receiver for discharging ground material, and grinding means communicating between said passageway and discharge member for grinding articles from said passageway and discharging ground material from said discharge member.

14 Claims, 13 Drawing Figures

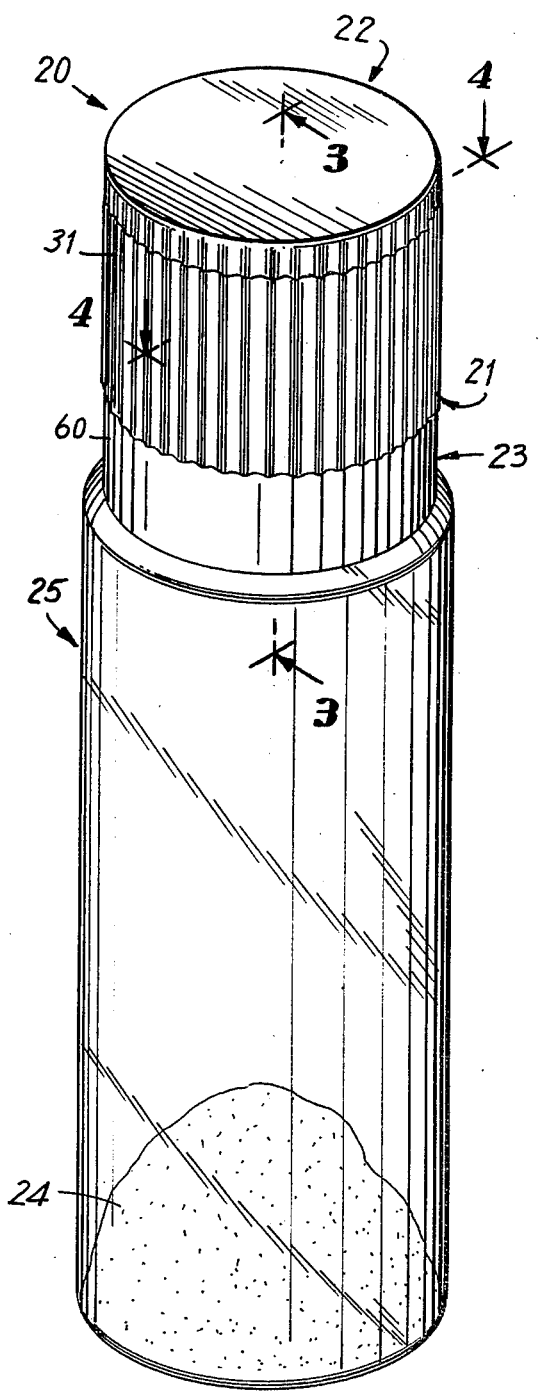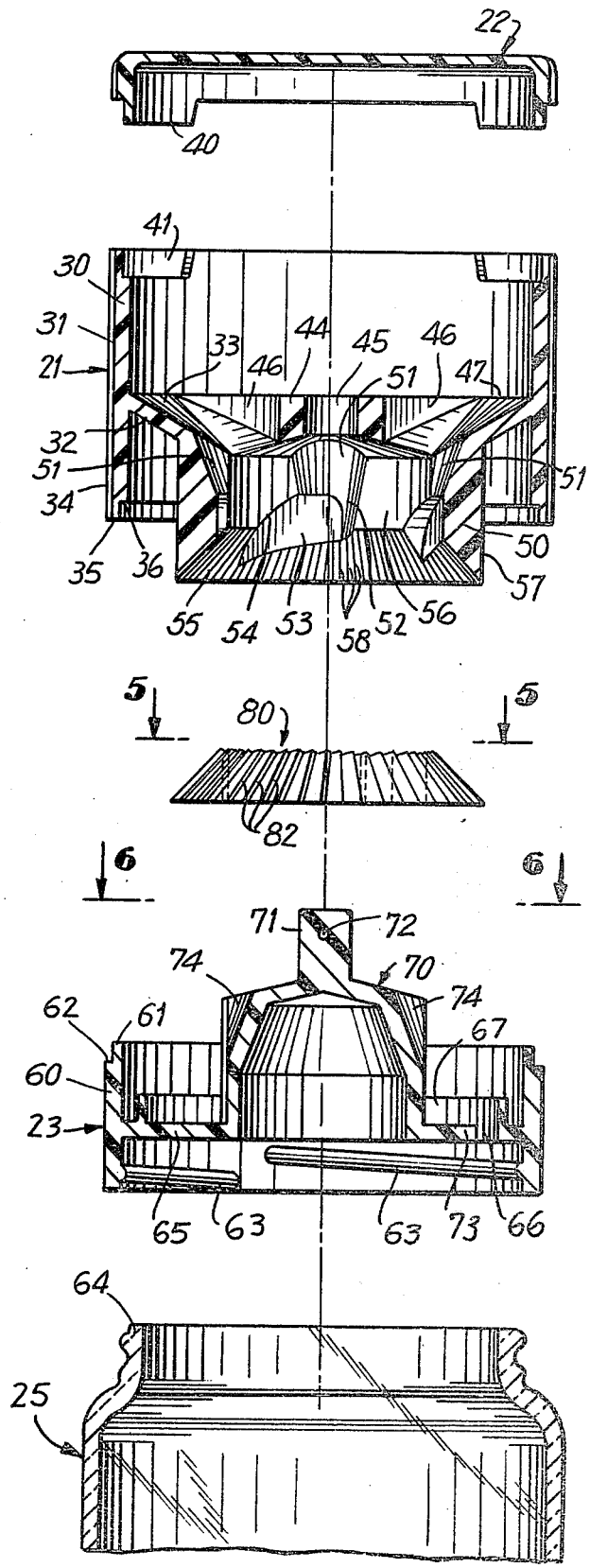

GRINDING MILL FOR COFFEE BEANS AND THE LIKE

BACKGROUND OF THE INVENTION

While there are, in the prior art, a substantial number of grinding devices, as for coffee beans and like articles, such prior devices have not been entirely satisfactory, as requiring undue physical exertion for manual operation, or a source of external power and the expense, inconvenience and restriction associated therewith, requiring relatively high internal forces to achieve the desired grinding action so as to require extremely heavy construction, undue size and weight, fixed mounting, and otherwise lacking in broad, general acceptability.

SUMMARY OF THE INVENTION

It is, therefore, an important object of the present invention to provide a grinding mill for coffee beans and the like which is capable of powered operation, but readily manually operable with a modicum of effort and little or no training to quickly and easily achieve the desired quantity of well ground coffee beans or like articles, and which otherwise fully accomplishes its intended objects.

It is still another object of the present invention to provide a grinding mill having the advantageous characteristics mentioned in the preceding paragraph which effectively reduces internal and unbalanced grinding forces to permit considerable savings in space, weight and bulk of the instant device, while facilitating operation with relatively little exertion, either manual or powered.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a top perspective view showing a grinding mill constructed in accordance with the teachings of the present invention.

FIG. 2 is an exploded vertical sectional view of the grinding mill of FIG. 1.

DESCRIPTION OF THE PREFERRED EMBODIMENT

Figure 3:
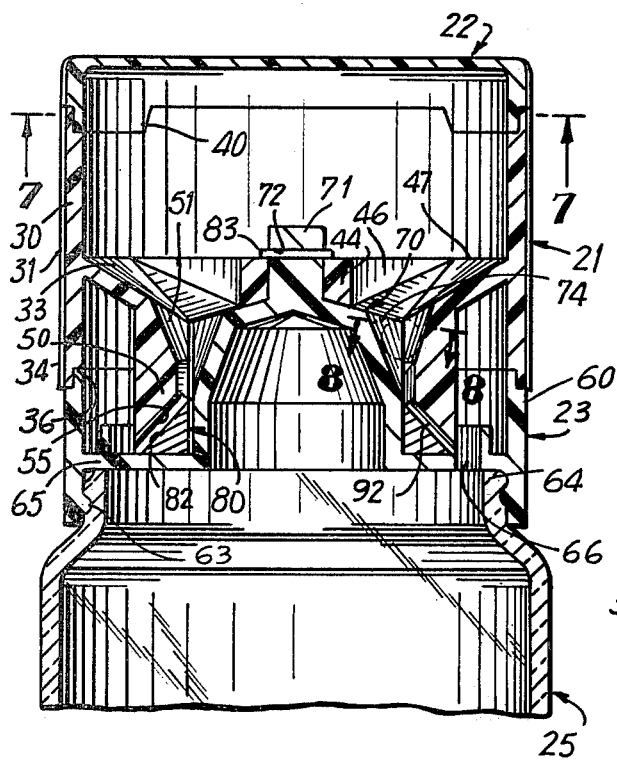
FIG. 3 is a partial vertical sectional view taken generally along the line 3—3 of FIG. 1.

Referring now more particularly to the drawings, and specifically to FIG. 1 thereof, a grinding mill is there generally designated 20, and includes a receptacle or receiver 21 for receiving material to be ground having a removable closure, cover or lid 22. Beneath the receiver or receptacle 21 may be a discharge member 23, which discharges granular or ground material, as at 24, into a container or jar 25. Of course, the grinding mill 20 may deliver or discharge ground material directly to a coffee urn, or the like, if desired.

Figure 4:
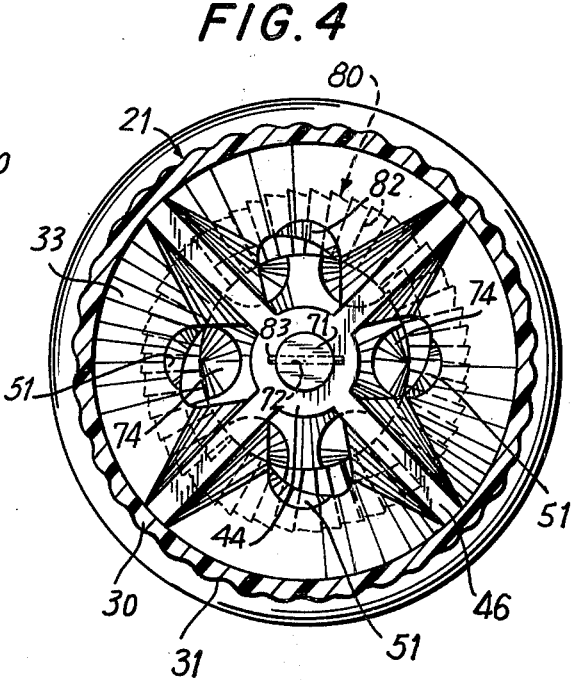
FIG. 4 is a horizontal transverse sectional view taken generally along the line 4—4 of FIG. 1.

The receiver or receptacle 21 is best seen in FIGS. 2 and 4, as including a normally generally upright or vertically disposed cylindrical peripheral or side wall 30, which may have longitudinally extending external ribs or flutes 31, say to facilitate manual grasping. Extending across the lower interior region of sidewall 30 the receiver may be formed with a bottom wall 32. The bottom wall 32 is in the lower region of the receiver 21 and may have its upper surface 33 concave or generally internally conical or funnel-like concentric with the side wall 31. Depending below the bottom wall 32, the side wall 31 is provided with a generally cylindrical extention or skirt 34 which may terminate in an annular depending lip 35 defining an internal annular shoulder 36, all for purposes appearing presently.

The closure, cover or lid 22 may be provided with spaced, depending tabs 40 for conforming engagement in mating recesses 41 located in spaced upper regions of side wall 31. Thus, the lid or cover 22 may conformably engage on and in closing or covering relation with respect to the receiver 30.

The bottom wall 32 may include a central hub or tubular member 44, generally coaxial with the cylindrical side wall 31 and having an open ended through passageway 45. The hub is fixedly supported in position by a plurality of generally radial struts or webs 46 extending in angularly spaced relation from the hub 44 to the upper bottom wall surface 33 and its intersection or meeting corner 47 with the side wall 31. The hub supporting webs or arms 46 thus upstand from the upper surface 33 of bottom wall 32.

Depending from the underside of generally conical or funnel-like bottom wall 32 is a generally cylindrical bottom wall extension 50. The bottom wall extension 50 is concentric with respect to and spaced radially inwardly of the receiver side wall 31 and its depending skirt 34, while being concentric with respect to and spaced outwardly of hub 44.

Extending generally vertically through the conical bottom wall 32 and into the internal surface of bottom wall extension 50 are a plurality of generally vertical through passageways 51, being at least one and illustrated as four, in number arranged in an annular array concentric with and about the hub 44. Each of the passageways 51 opens radially inwardly beneath hub 44, and is formed on its outer side with a generally semi conical downwardly and inwardly tapering surface 52, which surface opens into a lower outlet cavity 53 extending in one direction circumferentially from a lower region of the conical surface 52 and bounded on its upper side by a declining surface 54. The bottom wall extension 50 terminates at its lower edge, spaced below the lower edge or lip 35 of skirt 34 in a generally downwardly facing, internal conical surface 55. The downwardly facing lower surface 55 of depending bottom wall extension 50 extends generally from the inner cylindrical surface 56 of bottom wall extension to the outer cylindrical surface 57 of the bottom wall extension, except where cut away or recessed by formation of the passage way 51. For example, the lower circumferential extension 53 of passage way 51 has its lower region formed in the upper region of conical surface 55, for a purpose appearing presently. The surface configuration of surface 55 is suitably roughened, for purposes appearing presently, and may be provided with the generally axially extending teeth or ribs 58.

The discharge member 23 may include an outer cylindrical wall 60 having an annular, upstanding lip 61 defining an annular external shoulder 62, for conformably interfitting engagement with lip 35 and shoulder 36.

The lower interior region of side wall 60 may be internally threaded, as at 63, for conforming threaded engagement with an externally threaded bottleneck 64 of container 25.

Figure 6:
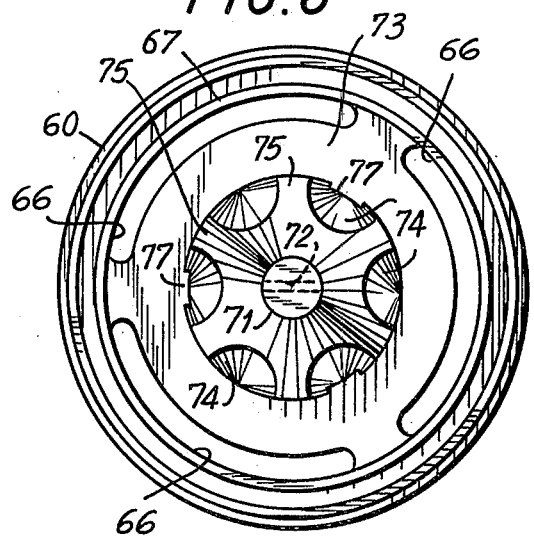
FIG. 6 is a plan view taken generally along the line 6—6 of FIG. 2.
Figure 7:
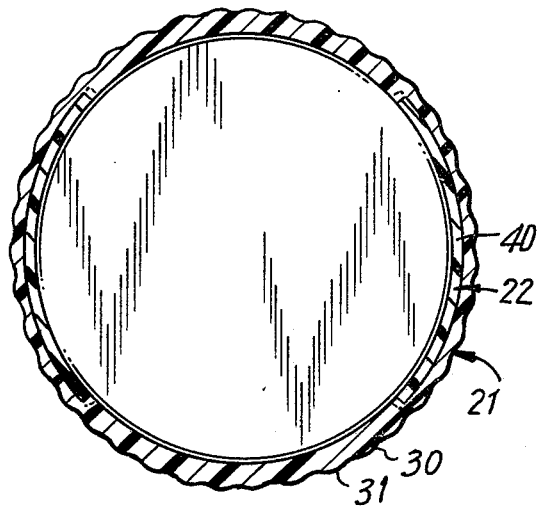
FIG. 7 is a transverse sectional view taken generally along the line 7—7 of FIG. 3.

Extending across the side wall 60, spaced between the upper and lower ends thereof, is an intermediate wall or partition 65 having formed therein adjacent to and spaced inwardly from the side wall 60 a plurality of end to end, spaced, arcuate discharge openings or slots 66, best seen in FIGS. 2 and 6. It will appear, see FIG. 6, that the discharge openings or slots 66 combine to define an annular configuration concentric with and spaced inwardly from the side wall 60. Bounding the annular configuration of slots or discharge openings 66, upstanding from the horizontal partition or wall 65, is a cylindrical flange or lip 67.

Upstanding centrally from the horizontal wall or partition 65, spaced radially inwardly from and concentric with respect to the annular array of discharge slots 66, is a formation or boss 70 which projects upwardly beyond the upper lip 61 of said wall 60. The upstanding formation or boss 70 is of generally cylindrical external configuration, having an external diameter less than the internal diameter of internal surface 56 of depending bottom wall extension 50. Upstanding centrally from the formation or boss 70 is a journal post or lug 71, which may be formed adjacent to its upper end with a through opening or hole 72. The upstanding boss 70 is spaced radially inwardly from the several slots 66, to leave there between a circular portion or annular land 73. At equally angularly spaced locations about the generally cylindrical boss 70, there are formed therein extending downwardly from the upper surface thereof a plurality of generally semi-conical formations or recesses 74. Between each adjacent pair of semi-conical recesses 74 there remains a radially outstanding projection or rib, as at 75, which projections define obstacles, as will appear more fully hereinafter. Viewed otherwise, the obstacles or ribs 75 may be considered as a plurality of angularly spaced radial projections leaving there between the recesses or flutes 74. The projections or obstacles 75 are configured in relation to the passageways 51, being shown in the illustrated embodiment as the obstacles 75 being locatable in selected passage ways 51 to obstruct passage through a passage way of an article. Further, there is a desired relationship between the relative number and arrangement of passageways 51 and obstacle 75. In the illustrated embodiment there are six (6) obstacles 75 and four (4) passageways 51, the arrangement being such as to permit of opening or non obstruction of only a pair of diametrically opposed passageways at any instant in time. Thus, the obstacles 75 serve to reduce to a desired number the open passageways 51, thereby limiting the number of passageways passing an article to be ground at any particular time.

Figure 5:
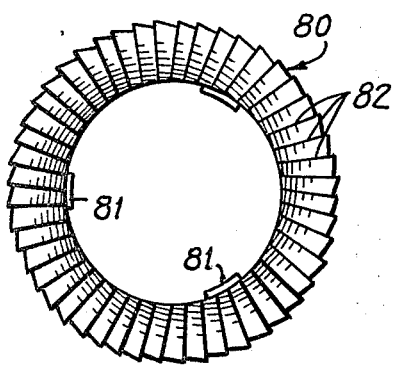
FIG. 5 is a plan view taken generally along the line 5—5 of FIG. 2.

In addition to the aforementioned configuration of boss 70, the boss is further provided at angularly spaced locations there about with formations, such as notches 77, opening regularly outwardly in equally angular spaced relation there about. A generally annular grinding member is generally designated 80, being best seen in FIGS. 2 and 5, is sized to fit snugly about the boss 70 and seat on the annular land 73 terminating radially outwardly proximate to the slots or discharge openings 66. Internally of the annular grinding member 80 there are provided a plurality of lugs or formations 81 for conforming, non-rotative interfitting engagement with recesses 77. The exterior of annular grinding member 80 is generally frusto-conical and formed with a plurality of inclined biting elements or teeth 82. Specifically, the teeth 82 incline in a direction toward an adjacent declining recess wall 54, as will appear more fully hereinafter.

In the assembled condition, the grinding element 80 is non-rotatably seated on annular land 73, as best seen in FIG. 3, and post 71 upstands rotatably through tubular hub 44, projecting beyond the latter for reception of a suitable retaining member, such as cross pin 83. It will now be appreciated that the lower discharge member 23 is coaxially rotatable relative to the upper receiver 21, the passageways 51 communicating downwardly through an inter-space between facing grinding element 80 and the under surface 55 of bottom wall extension 50. The under surface 55 of the bottom wall depending extension 50 is also a cooperative grinding element in facing spaced relation with respect to the grinding element 80. From the inter-space between grinding elements 80 and 55, ground granular material may pass for discharge through openings 66.

The specific grinding operation is best seen in FIGS. 8-12.

Figure 8:
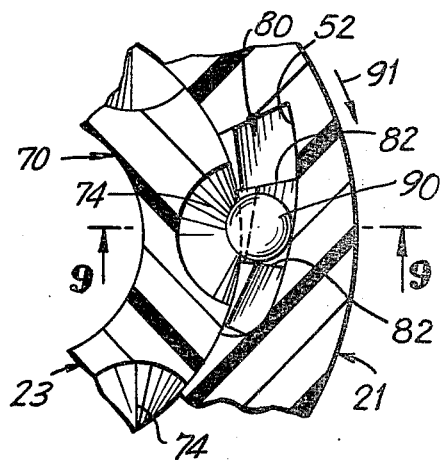
FIG. 8 is a fragmentary horizontal sectional view taken generally along the line 8—8 of FIG. 3.
Figure 9:
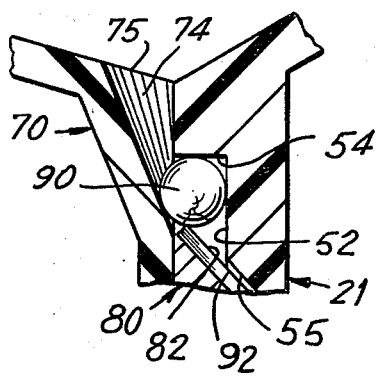
FIG. 9 is a fragmentary vertical sectional view taken generally along the line 9—9 of FIG. 8.

More particularly, in FIGS. 8 and 9 it will be observed that a semi-conical groove or flute 74 is in radial alignment, registry or opening into an adjacent passageway 52 so that a single coffee bean or other article 90 passes gravitationally down the groove 74 into passageway 52. Passageway 52 and its circumferential extension 53 open downwardly toward the upwardly and outwardly facing grinding element 80. Upon relative rotation of the bottom wall extension 50 generally clockwise, as indicated by the arrow 91, relative to the boss 70, by reason of the gradually increasing width of passageway 52 the article 90 falls further into the passageway and onto the upwardly and outwardly facing grinding member 80. The teeth 82 of the grinding member 80 incline in the direction against rotation of the passageway 52, counterclockwise in the illustrated embodiment. Also, the downwardly facing inclined wall 54 of passageway 52, see FIG. 9, is inclined in the direction of passageway movement, and therefore inclined opposed to the direction of inclination of teeth 82.

Figure 10:
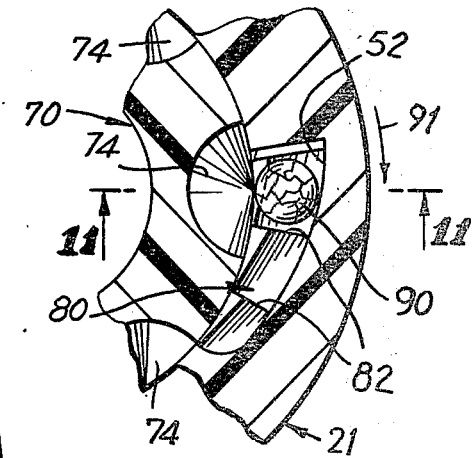
FIG. 10 is a view similar to FIG. 8, but illustrating a slightly later stage in the grinding operation.
Figure 11:
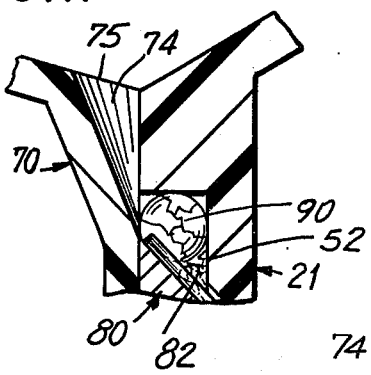
FIG. 11 is a fragmentary sectional view taken generally along the line 11—11 of FIG. 10.
Figure 12:
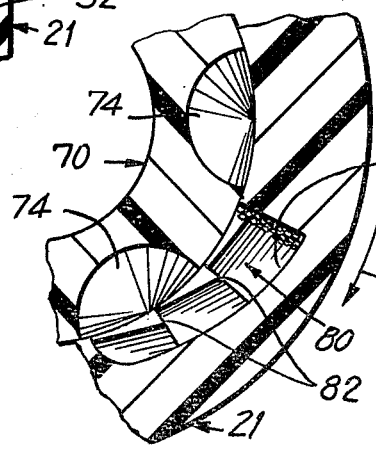
FIG. 12 is a fragmentary horizontal sectional view similar to FIGS. 8 and 10, but showing still a later condition of milling operation.

By this action, upon continued relative rotation of the receiver 21 clockwise with respect to the discharge member 23, a single bean or article 90 is wedged between the relatively oblique inclined passageway wall portion 54 and grinding element 80, and crushed upon continued relative movement there between. This condition is best shown in FIGS. 10 and 11. The crushing action increases until the article is crushed into sufficiently small particles to enter in the space between the facing, conical lower grinding member 80 and upper grinding member 55. In the space between the lower and upper grinding members 80 and 55, the article 80 is further comminuted, pulverized or ground to the desired granular particle size. The inter-grinding member space 92 is of downwardly diverging or conical configuration opening to the circular array of apertures 66 for discharging ground material through the apertures. The generally circular bounding wall or upstanding flange 67 effectively controls and guides flow of ground material for gravitational discharge through the openings 66.

While the embodiment illustrated and described herein is of manual operation, it is appreciated that the device may readily be powered, if desired. Also, while a single coffee bean or article 90 is illustrated and described, it is understood that the receiver is filled with a desired quantity of such articles, which are constrained to successive entry into respective passageways 52 to avoid jamming and limit the operating forces required. Also, in the illustrated embodiment a pair of opposed passageways 52 will simultaneously register or align with a pair of opposed grooves or flutes 74 for simultaneous grinding operation therein, while the remaining passageways will be occluded or closed by projections or obstacles 75. In this manner, internal stresses and reaction forces are effectively counter-balanced to simplify design, reduce necessary strength and size, and facilitate operation. However, a greater or lesser number of passageways may be in grinding operation simultaneously, as desired.

Figure 13:
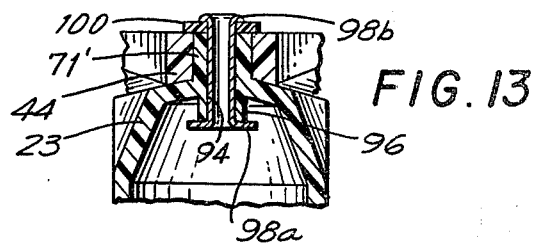
FIG. 13 is a fragmented view generally similar to FIG. 3, showing a rivet in place of a transverse pin for connecting the upper and lower members to each other.

In FIG. 13, there is illustrated a presently preferred mode of coaxially and rotatably connecting the lower discharge member 23 to the upper receiver 21. Here, the post 71' has a height substantially equal to the axial thickness of the tubular hub 44 so that the upper surfaces of the post and tubular hub are substantially coplanar, as shown, when the unit is assembled. An axial hole or bore 94 extends through the lower discharge member, including the post 71' and a coaxial downwardly projecting standoff 96. A rivet is inserted through the hole or bore 94, with its head 98a abutting against the stand-off 96 and the remote end 98b of the rivet projecting above the tubular hub 44. In assembly, a nylon washer 100 is coaxially disposed over the tubular hub 44 before the upper end 98b of the rivet is rolled over as shown. The nylon washer assures that the rolled over edge of the rivet does not contact the tubular hub to thereby reduce friction during use and prevent damage to the unit. Similarly, the standoff 96 minimizes the friction between the rivet head 98a and the surface of the lower discharge member 23.

It will, therefore, now be appreciated that the present invention provides a uniquely advantageous grinding mill for coffee beans, and the like, which is extremely simple in construction and design, relatively small and compact for ease of storage and handling, well suited for manual or powered operation, and otherwise fully accomplishes its intended objects.

Although the present invention has been described in some detail by way of illustration and example of purposes of clarity of understanding, it is understood that certain changes and modifications may be made within the spirit of the invention.

What is claimed is:

1. A grinding mill for coffee beans and like articles comprising a receiver including a bottom wall and peripheral side wall for receiving articles to be ground, said bottom wall having a plurality of passageways each sized for successively and gravitationally passing articles to be ground, a discharge member beneath and rotatably connected to said receiver and having a discharge opening communicating with said passageways for receiving material therefrom, and grinding means interposed between said passageways and discharge opening for grinding articles and passing granular material to said discharge opening, obstructing means on said discharge member generally between said grinding means and said plurality of passageways for rotation with said discharge member into and out of obstructing relation with said passageways, said obstructing means being configurated to simultaneously obstruct certain of said passageways and open other of said passageways, to thereby limit the number of coffee beans and like articles which can be ground at any given time by said grinding means.

2. A grinding mill according to claim 1, said grinding means including a grinding element on said discharge member in facing spaced relation beneath said bottom wall.

3. A grinding mill according to claim 2, said grinding means comprising an additional grinding element on said bottom wall in facing spaced relation with said first mentioned grinding element.

4. A grinding mill according to claim 3, said additional grinding element comprising teeth projecting toward said first mentioned grinding element.

5. A grinding mill according to claim 2, said grinding element facing upwardly into said passageway for grinding engagement with an article in said passageway.

6. A grinding mill according to claim 5, said passageway including a wall portion declining toward said grinding element for wedging there between of an article to be ground.

7. A grinding mill according to claim 6, said grinding element including teeth inclining toward said wall portion for biting engagement with a wedged article.

8. A grinding mill according to claim 1, said obstructing means being configured to open an opposed pair of passageways while obstructing other passageways, for limiting and counter balancing internal forces.

9. A grinding mill according to claim 1, said obstructing means comprising a plurality of projections movable transversely through said passageways for obstructing the same, said projections being spaced to define between each adjacent pair of plurality of guide paths for guiding articles sequentially into said passageways.

10. A grinding mill for coffee beans and like articles comprising a receiver including a bottom wall and peripheral side wall for receiving articles to be ground, said bottom wall having a plurality of passageways arranged in a generally circular array concentric with the axis of rotation of a discharge member for gravitationally passing articles to be ground, said discharge member being beneath and rotatably connected to said receiver and having a discharge opening communicating with said passageways for receiving material therefrom, and grinding means interposed between said passageways and discharge opening for grinding articles and passing granular material to said discharge opening, said grinding means being in circular concentricity with said axis and facing upwardly into said passageways, and obstructing means on said discharge member generally between said grinding means and said plurality of passageways for rotation with said discharge member into and out of obstructing relation with said passageways, said obstructing means being configured to simultaneously obstruct certain of said passageways and open other of said passageways, to thereby limit the number of coffee beans and like articles which can be ground at any given time by said grinding means.

11. A grinding mill according to claim 10, said passageways each including a wall portion declining toward said grinding means for wedging there between of an article to be ground.

12. A grinding mill according to claim 11, said grinding means including teeth inclined generally toward said wall portions for biting engagement with a wedged article.

13. A grinding mill according to claim 10, said obstructing means being configured to open an opposite pair of passageways while obstructing the remaining passageways, for limiting and counter balancing internal forces.

14. A grinding mill according to claim 13, said obstructing means comprising a plurality of projections movable transversely through said passageways for obstructing the same, said projections being spaced to define between adjacent pairs thereof guide paths for guiding articles sequentially into said passageways.

* * * * *